United States Patent
Yi

(10) Patent No.: US 8,888,548 B2
(45) Date of Patent: Nov. 18, 2014

(54) APPARATUS OF DISPENSING LIQUID CRYSTAL USING THE ULTRASONIC WAVE

(75) Inventor: Sung Il Yi, Seoul (KR)

(73) Assignee: Korea Institute of Industrial Technology, Cheonan ( * ) Notice: Subject to any disclaimer, the term of this patent is extended or adjusted under 35 U.S.C. 154(b) by 487 days.

(21) Appl. No.: 13/389,185

(22) PCT Filed: Aug. 10, 2010

(86) PCT No.: PCT/KR2010/005234
§ 371 (c)(1),
(2), (4) Date: Feb. 6, 2012

(87) PCT Pub. No.: WO2011/019186
PCT Pub. Date: Feb. 17, 2011

(65) Prior Publication Data
US 2012/0135663 A1    May 31, 2012

(30) Foreign Application Priority Data

Aug. 10, 2009  (KR) .................. 10-2009-0073235

(51) Int. Cl.
*H01J 9/46* (2006.01)
*G02F 1/13* (2006.01)
*B05B 17/06* (2006.01)
*G02F 1/1341* (2006.01)

(52) U.S. Cl.
CPC ........... *B05B 17/063* (2013.01); *B05B 17/0623* (2013.01); *G02F 1/1303* (2013.01); *G02F 2001/13415* (2013.01)
USPC ............................................. 445/66; 445/24

(58) Field of Classification Search
CPC .................... G02F 1/1303; G02F 2001/13415; B05B 17/063
USPC ...................................................... 445/24, 66
See application file for complete search history.

(56) References Cited

FOREIGN PATENT DOCUMENTS

| | | |
|---|---|---|
| JP | 05-282934 A | 10/1993 |
| KR | 10-2006-0079069 A | 7/2006 |
| KR | 10-2007-0071373 A | 7/2007 |
| KR | 10-2007-0073478 A | 7/2007 |
| KR | 10-2009-0006461 A | 1/2009 |

*Primary Examiner* — Andrew Coughlin
(74) *Attorney, Agent, or Firm* — Patent Office of Dr. Chung Park

(57) ABSTRACT

There is disclosed a apparatus of dispensing crystal dispensing which dispenses liquid crystal on a substrate after atomizing liquid down to predetermined-sized particles. The apparatus of dispensing crystal dispensing using ultrasonic wave includes a syringe comprising a storage room to store liquid crystal therein, an atomizing/dispensing unit configured to dispense the liquid crystal supplied from the syringe after atomizing the liquid crystal, and a gas supply unit configured to apply a predetermined pressure to the liquid crystal to supply the liquid crystal stored in the storage room of the syringe to the atomizing/dispensing unit.

9 Claims, 7 Drawing Sheets

APPARATUS OF DISPENSING LIQUID CRYSTAL USING THE ULTRASONIC WAVE

CROSS-REFERENCE TO PRIOR APPLICATIONS

This application is a national Stage Patent Application of PCT International Patent Application No. PCT/KR2010/005234, filed on Aug. 10, 2010 under 35 U.S.C. §371, which claims priority of a Korean Patent Application No. 10-2009-0073235, filed on Aug. 10, 2009, which are all hereby incorporated by reference in their entirety.

FIELD

The present invention may relate to a apparatus of dispensing crystal dispensing, more particularly, to a apparatus of dispensing crystal dispensing which dispenses liquid crystal on a substrate after atomizing liquid down to predetermined-sized particles.

BACKGROUND

Generally, a flat panel display (FPD) refers to an image display that is thinner and lighter than a television or monitor using a cathode-ray tube. Such a FPD includes a liquid crystal display (LCD), a plasma display panel (PDP), a field emission display (FED) and an organic light emitting diode (OLED).

Among them, the LCD is an image display device capable of displaying a desired image by controlling light transmissivity based on data signals according to image information provided to liquid crystal cells aligned as a matrix-type. The LCDs have been used broadly because they are thin and light with low power consumption and low operation voltage consumption.

A method for manufacturing a conventional liquid crystal panel typically used in such the LCD will be described as follows. First of all, color filters and common electrodes are formed on a top glass substrate according to a preset pattern. Hence, thin film transistors (TFT) and pixel electrodes are formed on a bottom glass substrate facing the top glass substrate according to a preset pattern. After that, an alignment layer is coated on each of the substrates and the alignment layer is rubbed to prove a pretilt angle and an alignment direction to liquid crystal particles of a liquid crystal layer formed between the substrates.

Sealant paste is coated on either of the substrates according to a preset pattern by a dispenser, to maintain cell gaps and prevent the liquid crystal from leaking outside and to keep sealing between the substrates airtight. In this instance, a process of dotting conductive paste is further performed to connect the common electrodes with the pixel electrodes formed on the substrates, respectively.

Hence, the liquid crystal layer is formed between the substrates and a liquid crystal panel is manufactured. In this instance, liquid crystal injecting and liquid crystal dispensing are used for forming the liquid crystal layer.

In this instance, in the liquid crystal injecting, the substrates are adhered to each other and liquid crystal is injected between the adhered substrates via an injecting hole formed in the substrates and the liquid crystal layer is formed after the injecting holes are sealed airtight. In the liquid crystal dispensing, liquid crystal is dispensed to a preset space defined by sealant of the substrate by using an apparatus of dispensing crystal dispensing. After that, the substrates are adhered to each other and the sealant is hardened to bond them.

Meanwhile, as the liquid crystal display panel has been getting enlarged and mass-productive, there may be a method for dispensing liquid crystal on the substrate to fill the liquid crystal. In this method, a sealing material is formed on an edge region of a thin film transistor substrate or a color filter substrate and the liquid crystal is dispensed. After that, the two substrates are adhered to each other in opposite and the liquid crystal is disposed between the two substrates.

In the process of manufacturing the liquid crystal panel, the liquid crystal dispensing device is used to dispense the liquid crystal and the apparatus of dispensing crystal dispensing includes a nozzle that exhausts the liquid crystal transported from a syringe storing the liquid crystal on a substrate, while relative-moving with respect to the substrate.

In the apparatus of dispensing crystal dispensing, the amount of the liquid crystal fully stored in the syringe is gradually reduced as the liquid crystal is exhausted from the nozzle. Accordingly, the pressure in the syringe is changed and it is impossible to exhaust a preset amount of liquid crystal via the nozzle.

This might deteriorate the quality of the liquid crystal panel. Accordingly, it is necessary to maintain the pressure in the syringe uniformly while the liquid crystal is exhausted via the nozzle. Especially, as the desired amount of the liquid crystal exhausted via the nozzle is getting smaller, such a disadvantageous phenomenon might be getting worse even in a minute pressure change in the syringe. It can be said that such the necessity is quite important.

As mentioned above, the liquid crystal is dispensed one by one lump anisotropically in the apparatus of dispensing crystal dispensing adapting the liquid crystal dispensing method. However, the liquid crystal contained in one lump might be distributed unevenly. As the liquid crystal is spreading, the density of the liquid crystal might be different for each of points.

As a result, a physical property of the liquid crystal such as viscosity might be changed and the physical property of the liquid crystal might be varied with respect to an entire liquid crystal panel. Accordingly, dispensing spots that makes a clean image quality difficult to gain might be generated.

Meanwhile, in reference to FIGS. 1 and 3, a process of dispensing the liquid crystal on the substrate by using the conventional apparatus of dispensing crystal dispensing will be described as follows.

As shown in FIG. 1, the apparatus of dispensing crystal dispensing 10 is arranged beyond a substrate (S). Although not shown in the drawings, liquid crystal (L) is filled in the apparatus of dispensing crystal dispensing 10 to dispense a preset amount of the liquid crystal on the substrate (S).

Typically, the liquid crystal (L) is dispensed on the substrate (S) in a droplet shape. The substrate (S) is conveyed according to a speed preset along x and y directions of orthogonal coordinates and the apparatus of dispensing crystal dispensing 10 exhausts the liquid crystal (L) at preset regular time intervals. Accordingly, the liquid crystal (L) dispensed on the substrate (S) is arranged at preset intervals along x and y directions.

In this instance, the substrate (S) is fixed while the liquid (L) is dispensed. The liquid crystal (L) may be dispensed at preset intervals while the apparatus of dispensing crystal dispensing 10 is conveyed along x and y directions.

The liquid crystal (L) is dispensed on the substrate (S) by the apparatus of dispensing crystal dispensing 10 in a droplet shape. When the circular-shaped liquid crystal (L) is dispensed on the substrate (S) as shown in FIG. 2, a square in contact with the circular liquid crystal (L) may be assumed. In this instance, there might be a region where the liquid crystal (L) is not distributed and the region is as far as a distance (a) from the liquid crystal (L) to a corner of the square.

When the liquid crystal (L) is dispensed on the substrate (S), a plurality of liquid crystal droplets may be dispensed as shown in FIG. 3.

Accordingly, there might be on the substrate (S) the region where the liquid crystal (L) is not distributed. If the liquid crystal droplets are overlapped to prevent the region, there might be too much dispensed liquid crystal (L) disadvantageously.

DETAILED DESCRIPTION OF THE INVENTION

Technical Problem

To solve those disadvantages, an object of the invention is to provide an apparatus of dispensing crystal dispensing that uses ultrasonic wave to solve the disadvantage of the region having no distributed liquid crystal located in an edge of a substrate.

Another object of the present invention is to provide an apparatus of dispensing liquid crystal using ultrasonic wave that enables serial processes by atomizing the liquid crystal into predetermined-sized particles, without being partially attached to an end of a nozzle or held together on a surface of the nozzle.

A further object of the present invention is to provide an apparatus of dispensing liquid crystal using ultrasonic wave that can dispense the liquid crystal on the substrate uniformly by controlling the speed of transferring a syringe and the pressure supplied to the syringe based on the density of the liquid crystal dispensed on the substrate, even when a path of dispensing the liquid crystal is overlapped or the speed of the syringe is changed.

Technical Solution

To achieve these objects and other advantages, in an embodiment of the invention, a apparatus of dispensing crystal dispensing using ultrasonic wave includes a syringe comprising a storage room where liquid crystal is stored; an atomizing/dispensing unit configured to dispense the liquid crystal supplied from the syringe after atomizing the liquid crystal; and a gas supply unit configured to apply a predetermined pressure to the liquid crystal to supply the liquid crystal stored in the storage room of the syringe to the atomizing/dispensing unit.

In this instance, the atomizing/dispensing unit may include a case comprising a liquid crystal injecting hole in communication with the syringe; a nozzle body coupled to the case through an exhausting hole of an end from a center along a vertical direction, to connect the liquid crystal injecting hole and the exhausting hole with each other; an ultrasonic wave oscillating unit provided in the nozzle body to oscillate the nozzle both along a vertical direction; and a dispersion preventing part provided under the nozzle body to form a space spaced apart a predetermined distance from the nozzle body, with forming an air-curtain from the exhaustion hole to the substrate to prevent the liquid crystal dispensed on the substrate via the exhaustion hole of the nozzle body from dispersing out of a predetermined region by injecting compressed air via the space.

The gas supply unit may include a storage tank to store gas supplied to compress the liquid crystal stored in the storage room of the syringe; a gas supply pipe to connect the storage tank and the storage room of the syringe with each other to supply the gas stored in the storage tank to the storage room of the syringe; and an adjusting valve provided in the gas supply pipe to adjust the supply amount of the gas supplied to the storage room of the syringe from the storage tank.

The gas supply unit may further include a pressure sensor provided in the gas supply pipe between the adjusting valve and the syringe to measure the pressure of the gas supplied to the syringe via the adjusting valve; and a constant pressure controlling part comprising a pressure controller configured to control an opening degree of the adjusting valve based on the pressure measured by the pressure sensor, to maintain the pressure of the gas supplied to the syringe uniformly.

The apparatus of dispensing crystal dispensing using ultrasonic wave may further include a transfer part configured to transfer the syringe along horizontal and vertical directions to dispense the liquid crystal on an entire region of the substrate.

In this instance, the transfer speed of the transfer part may be variable to adjust the speed of transferring the syringe.

The apparatus of dispensing crystal dispensing using ultrasonic wave may include a dispensing amount controlling part configured to control at least one of the transfer speed of the syringe and the pressure applied to the syringe according to the density of the liquid crystal dispensed on the substrate by the atomizing/dispensing unit.

There may be further provided a dispersion preventing part located under the nozzle body of the atomizing/dispensing unit to form an air-curtain from the exhaustion hole to the substrate by using the compressed air, to prevent the liquid crystal dispensed on the substrate via the exhaustion hole of the nozzle body from dispersing out of a predetermined region.

In this instance, the dispersion preventing may include a shroud coupled to the nozzle body to form a space spaced apart a predetermined distance from the nozzle body; and an air injecting part provided in a side of the shroud to inject compressed-air via the space between the nozzle body and the shroud.

Also, an end of the shroud provided in the dispersion preventing part may be inclined to lessen an inner diameter gradually, the end facing the exhausting hole.

The shroud may include a height adjusting part to adjust the height of the end of the shroud with respect to the exhausting hole.

Advantageous Effects

The apparatus of dispensing liquid crystal having the configuration mentioned above may have following advantageous effects.

First, the liquid crystal may be atomized to predetermined-sized particles by the atomizing/dispensing unit and the liquid crystal may be distributed even on an edge region of the substrate uniformly. As a result, there may be an effect of dispensing the liquid crystal on the substrate efficiently.

Second, the ultrasonic wave may prevent the liquid crystal from being attached to or held together at an end of the exhausting hole and it may atomize the liquid crystal into predetermined-sized particles. As a result, there may be an effect of enabling serial processes possible.

Third, the path of the liquid crystal dispensed on the substrate is overlapped or the speed of transferring the syringe is changed. Accordingly, the speed of transferring the syringe and the supply pressure of the liquid crystal supplied to the syringe may be controlled based on the expected density of the liquid crystal dispensed on the substrate. As a result, there may be an effect of dispensing the liquid crystal on the substrate uniformly.

Last, the dispersion preventing part is further provided to form air-curtain to prevent the liquid crystal injected via the exhausting hole from being dispersed out of a predetermined region on the substrate. As a result, there may be an effect of enhanced dispensing efficiency.

DETAILED DESCRIPTION OF THE INVENTION

Reference may now be made in detail to specific embodiments, examples of which may be illustrated in the accompanying drawings. Wherever possible, same reference numbers may be used throughout the drawings to refer to the same or like parts.

Figure 4:
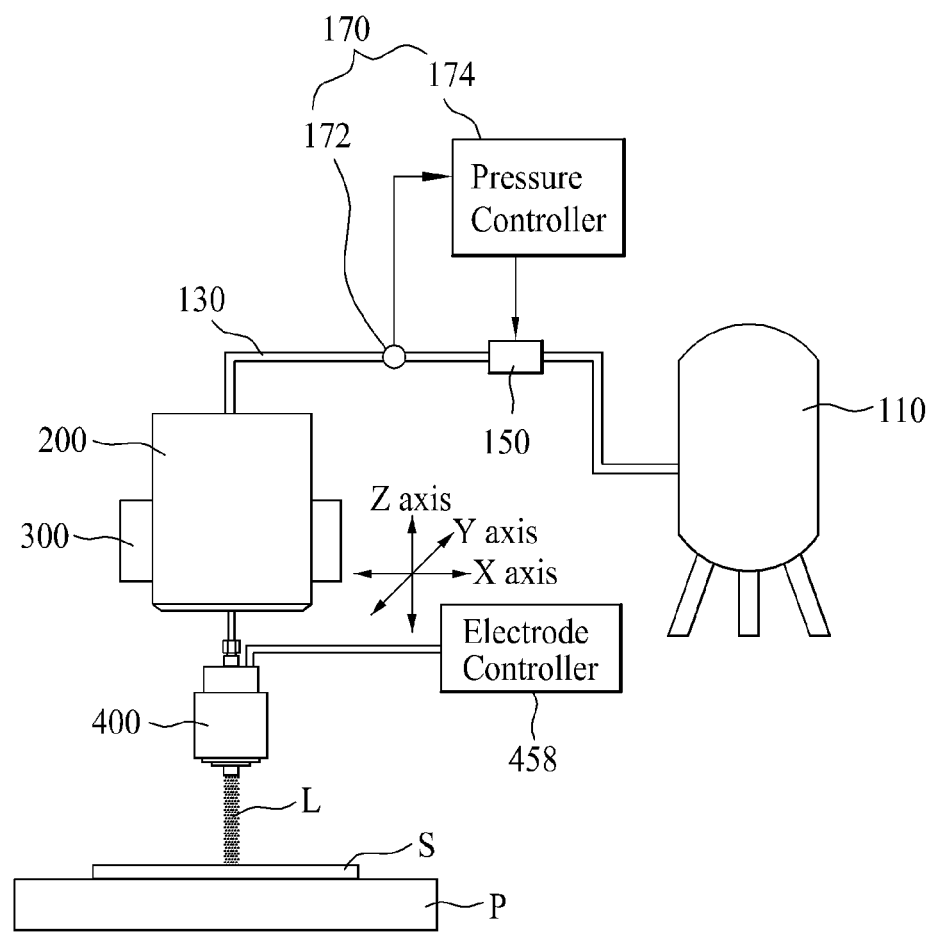
FIG. 4 is a schematic diagram of a apparatus of dispensing crystal dispensing using ultrasonic wave according to an embodiment of the invention.
Figure 5:
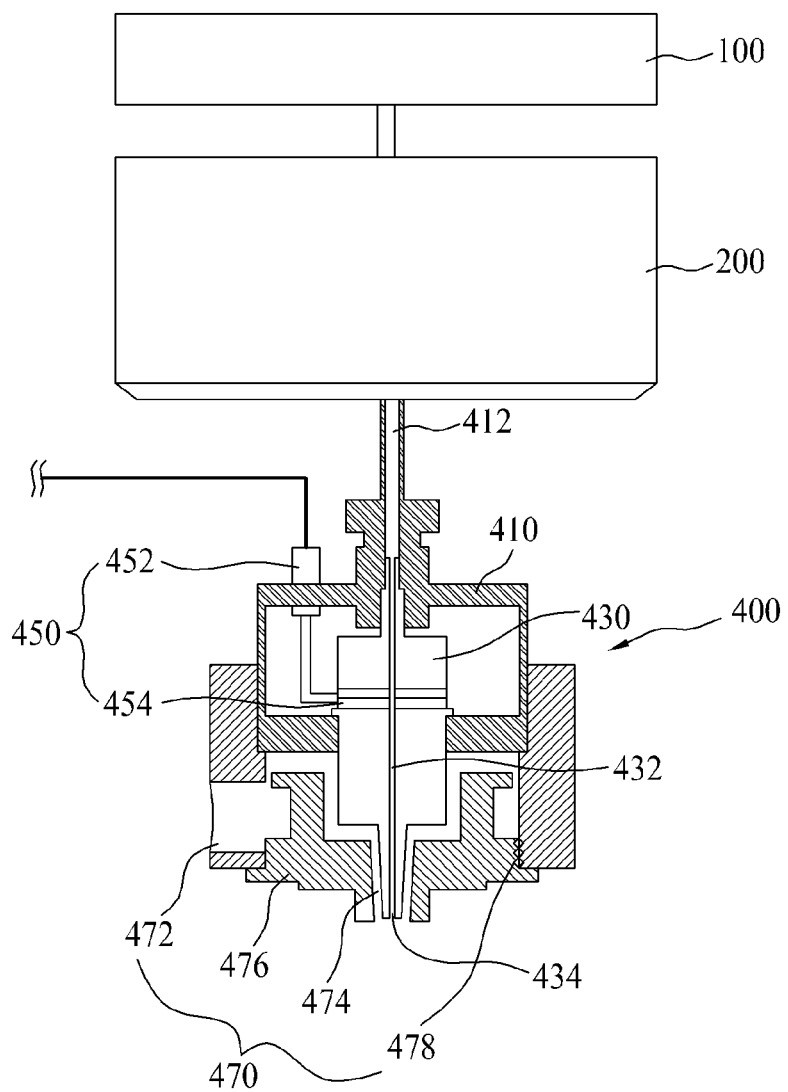
FIG. 5 is a detail diagram of an atomizing/dispensing unit shown in FIG. 4.

First of all, in reference of FIGS. 4 and 5, an apparatus of dispensing crystal dispensing using ultrasonic wave according to an embodiment of the invention will be described. FIG. 4 is a schematic diagram of an apparatus of dispensing crystal dispensing using ultrasonic wave according to an embodiment of the invention and FIG. 5 is a detail diagram of an atomizing/dispensing unit shown in FIG. 4.

The apparatus of dispensing crystal dispensing according to the embodiment of the invention may include a syringe 200 having a storage room to store liquid crystal (L), an atomizing/dispensing unit 400 to atomize the liquid crystal (L) supplied from the syringe 200 and to dispense the atomized liquid crystal on a substrate (S), and a gas supply unit 100 to apply a predetermined pressure to supply the liquid crystal (L) stored in the storage room of the syringe 200 to the atomizing/dispensing unit 400.

In this instance, as shown in FIG. 4, the gas supply unit 100 may include a storage tank 110 to store gas which will be supplied to press the liquid crystal (L) stored in the storage room of the syringe 200, a gas supply pipe 130 to connect the storage tank 110 and the storage room of the syringe 200 with each other to supply the gas stored in the storage tank 110 to the storage room of the syringe 200, and an adjusting valve 150 to adjust the supply amount of the gas stored in the storage tank 110 when the gas is supplied to the storage room of the syringe 200.

Also, the gas supply unit 100 may further include a constant pressure controlling part 170 having a pressure sensor 172 provided in the gas supply pipe 130 between the adjusting valve 150 and the syringe 200 to measure the pressure of the gas supplied to the syringe 200 via the adjusting valve 150 and a pressure controller 174 to control an opening degree of the adjusting valve 150 based on the pressure measured by the pressure sensor 172, to maintain the pressure of the gas supplied to the syringe 200 uniformly.

Accordingly, the constant pressure controlling part 170 controls the syringe 200 to supply the liquid crystal (L) to the atomizing/dispensing unit 400 uniformly.

In the state of storing the liquid crystal (L) in the storage room of the syringe 200, the gas stored in the storage tank 110 passes the gas supply pipe 130 and it then presses the liquid crystal (L) stored in the syringe 200. After that, the liquid crystal (L) is exhausted to the atomizing/dispensing unit 400.

To exhaust the liquid crystal (L) to the atomizing/dispensing unit 400 at a constant pressure, the gas stored in the storage tank 110 is supplied to the storage room of the syringe 200 based on the adjustment of the adjusting valve 150 provided in the gas supply pipe 130.

The pressure of the gas is adjusted by the adjusting valve 150 and the pressure of the gas passing the gas supply pipe 130 is measured by the pressure sensor 172. When a difference between the measured pressure and a preset value is generated, the pressure controller 174 controls an opening degree of the adjusting valve 150 and the pressure of the gas supplied to the storage room of the syringe 200 is controlled to be constant.

According to the embodiment as shown in FIG. 4, a transfer part 300 may be further provided to transfer the syringe 200 along horizontal and vertical directions to dispense the liquid crystal (L) on the substrate (S) fixed on a flange (P) uniformly.

Accordingly, the liquid crystal (L) may be dispensed on the substrate (S) in serial processes.

Meanwhile, the syringe 200 may be transferred along x-axis and y-axis directions on orthogonal coordinates by the transfer part 300 and the transferring speed of the syringe 200 may be variable.

In other words, the speed of transferring the syringe 200 may be changed variously according to the density of the liquid crystal dispensed on the substrate (S) by the atomizing/dispensing unit 400. This will be described in detail later.

As shown in FIG. 5, the atomizing/dispensing unit 400 may include a case 410 having a liquid crystal injecting hole 412 in communication with the syringe 200, a nozzle body 430 coupled to the case 410 within the case 410, with a liquid crystal path 432 vertically passing through to an exhausting hole 434 formed at an end from a center, to connect the liquid crystal injecting hole 412 of the case 410 with the exhausting hole 434, and an ultrasonic wave oscillating unit 450 provided in the nozzle body 430 to oscillate the nozzle body 430 vertically.

The case 410 is coupled to the nozzle body 430 to protect the ultrasonic wave oscillating unit 450.

According to this embodiment, the ultrasonic wave oscillating unit 450 includes a piezo-electric element provided in the nozzle body 430 and an electrode 452 connected with the piezo-electric element 454 to provide an electric energy to the piezo-electric element 454.

Figure 1:
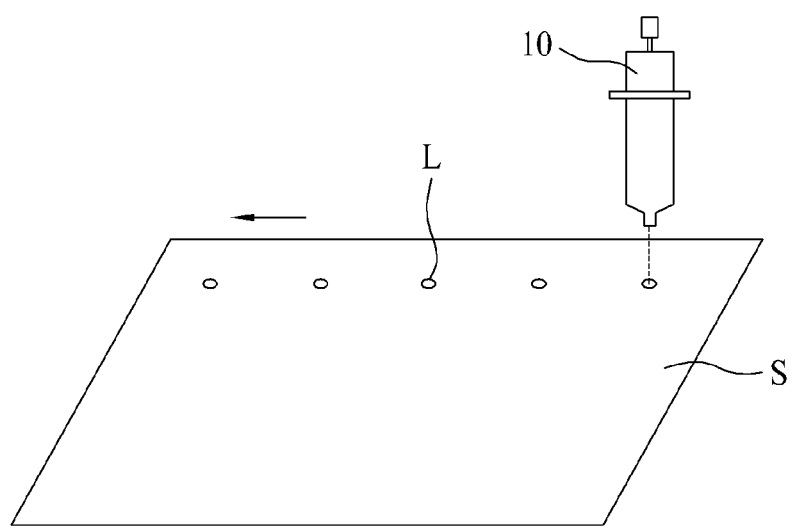
FIG. 1 is a diagram illustrating a state of liquid crystal dispensed on a substrate by a conventional apparatus of dispensing crystal dispensing.
Figure 2:
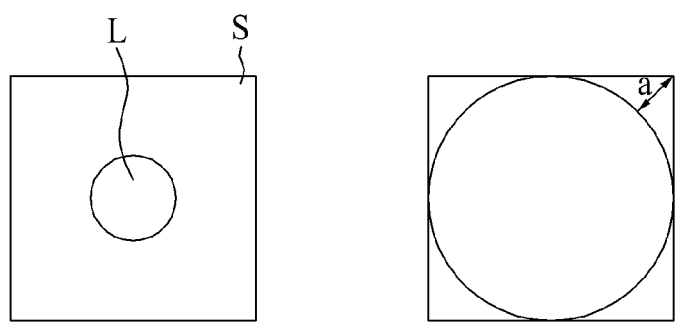
FIG. 2 is a diagram illustrating a pattern of the liquid crystal dispensed on the substrate by the conventional apparatus of dispensing crystal dispensing.
Figure 3:
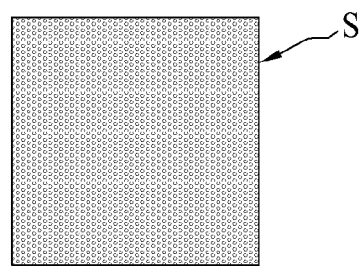
FIG. 3 is a diagram illustrating a pattern of the liquid crystal dispensed on the substrate by the conventional apparatus of dispensing crystal dispensing.

The electrode 452 is connected with an electrode controller 458 to adjust the electric energy provided to the piezo-electric element 454, as shown in FIG. 3.

In other words, the electrode controller 458 may determine the supply amount of the electric energy supplied to the electrode 452 from an external electric power source.

The electric energy is supplied to the piezo-electric element 454 according to this embodiment from the electrode 452 and the piezo-electric element 454 converts the electric energy into an oscillating energy used for oscillating the nozzle body 430 vertically.

Accordingly, the atomized liquid crystal may be dispensed on the substrate (S) fixed on the flange (P).

According to this embodiment there may be further provided a dispersion preventing part 470 located under the nozzle body 430 of the atomizing/dispensing unit 400 to form air-curtain from the exhaustion hole 434 to the substrate (S) by using the compressed air, to prevent the liquid crystal (L) dispensed on the substrate (S) via the exhaustion hole 434 of the nozzle body 430 from dispersing out of a predetermined region.

The dispersion preventing part 470 includes a shroud 476 coupled to the nozzle body 430 to provide a predetermined space 474 spaced apart a predetermined distance from the nozzle body 430 and an air injecting part 472 provided in a side of the shroud 476 to inject the compressed air via the space formed between the nozzle body 430 and the shroud 476.

Although not shown in the drawings, the dispersion preventing part 470 may form the air-curtain along the direction of the dispensing liquid crystal (L) to prevent the liquid crystal (L) from being dispensed to the other region than the predetermined region on the substrate (S) in the process of dispensing the atomized liquid crystal (L) on the substrate (S).

According to this embodiment, a compressed-air path is formed at an end of the shroud 476 of the dispersion preventing part 470 in opposite to the exhaustion hole 434 of the atomizing/dispensing unit 400, with being inclined to lessen an inner diameter thereof.

Accordingly, the compressed air passing the compressed-air path 474 that is the space 474 between the nozzle body 430 and the shroud 476 may be injected toward the liquid crystal (L) exhausted from the exhausting hole 434 of the atomizing/dispensing unit 400.

Also, the shroud 476 may further include a height adjusting part 478 to adjust the height of the end of the shroud 476 with respect to the exhausting hole 434 of the atomizing/dispensing unit 400.

In this instance, the compressed air passing the compressed-air path 474 may determine the region where the liquid crystal exhausted on the substrate (S) via the exhausting hole 434 of the atomizing/dispensing unit 400 is dispensed.

Figure 6:
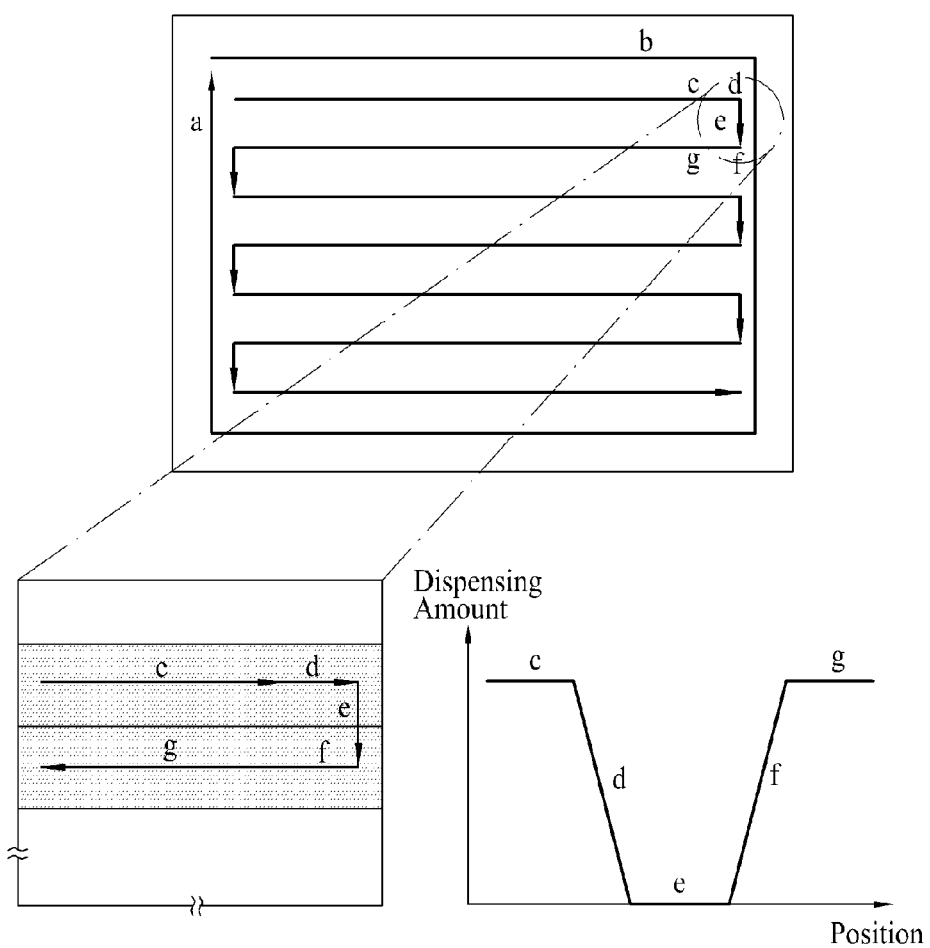
FIG. 6 is a diagram illustrating an operation principle of a dispensing amount controlling part according to a pattern of liquid crystal dispensed on a substrate by a apparatus of dispensing crystal dispensing using ultrasonic wave according to the embodiment of the invention.
Figure 7:
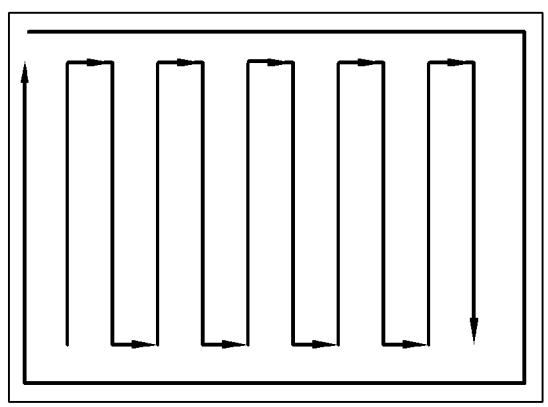
FIG. 7 is a diagram illustrating various patterns of the liquid crystal dispensed on the substrate by the apparatus of dispensing crystal dispensing using ultrasonic wave according to the embodiment of the invention.
Figure 7:
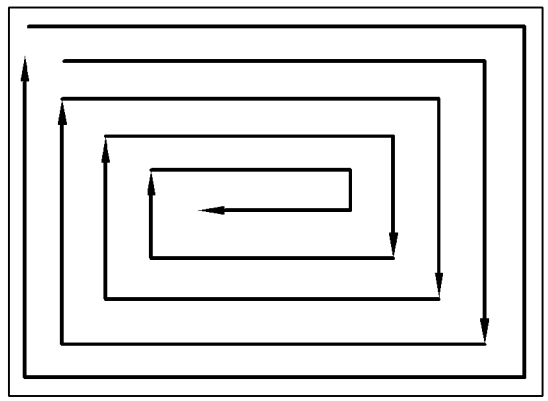

Next, in reference to FIGS. 6 and 7 will be described a dispensing process of the apparatus of dispensing crystal dispensing using ultrasonic wave with respect to an entire region of the substrate. In this instance, FIG. 6 is a diagram illustrating an operation principle of the dispensing amount controlling part according to a pattern of the liquid crystal dispensed on the substrate by the apparatus of dispensing crystal dispensing using ultrasonic wave according to the embodiment of the invention. FIG. 7 is a diagram illustrating various types of the liquid crystal dispensed on the substrate by the apparatus of dispensing crystal dispensing using ultrasonic wave according to the embodiment of the invention.

According to the invention, the transfer part 300 configured to transfer the syringe 200 dispenses the liquid crystal (L) atomized by the atomizing/dispensing unit 400 on the substrate (S) as shown in FIG. 4.

As shown in FIG. 6, the liquid crystal (L) is dispensed on an outermost region (a~b) of the substrate (S) and it is dispensed on an inner region of the substrate (S) in zigzag.

Accordingly, an overlapped region (e) is generated intermittently. When the section where the liquid crystal (L) is dispensed on the substrate (S) from a region adjacent to the overlapped section (e) is a c-region, the amount of the dispensed liquid crystal (L) is maintained uniformly. When the region is a d-region, the amount of the dispensed liquid crystal (L) is reduced gradually.

Also, in an e-region, the liquid crystal (L) is overlapped and the liquid crystal (L) is not dispensed but just passing.

In a f-region again, the amount of the dispensed liquid crystal (L) is increased gradually and in a g-region, the amount in the g-region becomes the same amount in the a, b and c regions.

As a result, the liquid crystal (L) may be dispensed over an entire region of the substrate (S) uniformly.

Although not shown in the drawings, there may be further provided a dispensing amount controlling part to control one of the transfer speed of the syringe 200 and the pressure supplied to the syringe 200 by the gas supply unit 100. The dispensing amount controlling part controls the dispensed liquid crystal amount by measuring the density of the liquid crystal (L) dispensed on the substrate (S) fixed to the flange (P).

For example, the transfer speed of the syringe 200 is increased by the transfer part 300 or the pressure of the gas supplied to the syringe 200 is lowered by the adjusting valve 150 of the gas supply unit 100, such that the amount of the liquid crystal (L) supplied to the atomizing/dispensing unit 400 from the syringe 200 may be reduced.

As shown in FIG. 7, the pattern of the liquid crystal (L) dispensed on the substrate (S) is not limited to a single one but various ones.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus of dispensing crystal dispensing using ultrasonic wave comprising:
   a syringe comprising a storage room to store liquid crystal therein;
   an atomizing/dispensing unit configured to dispense the liquid crystal supplied from the syringe after atomizing the liquid crystal; and
   a gas supply unit configured to apply a predetermined pressure to the liquid crystal to supply the liquid crystal stored in the storage room of the syringe to the atomizing/dispensing unit,
   wherein the atomizing/dispensing unit comprises,
   a case comprising a liquid crystal injecting hole in communication with the syringe;
   a nozzle body coupled to the case through an exhausting hole of an end from a center along a vertical direction, to connect the liquid crystal injecting hole and the exhausting hole with each other;
   an ultrasonic wave oscillating unit provided in the nozzle body to oscillate the nozzle both along a vertical direction; and a dispersion preventing part provided under the nozzle body to form a space spaced apart a predetermined distance from the nozzle body, with forming an air-curtain from the exhaustion hole to the substrate to prevent the liquid crystal dispensed on the substrate via the exhaustion hole of the nozzle body from dispersing out of a predetermined region by injecting compressed air via the space.

2. The apparatus of dispensing crystal dispensing using ultrasonic wave according to claim 1, wherein the gas supply unit comprises,
   a storage tank to store gas supplied to compress the liquid crystal stored in the storage room of the syringe;
   a gas supply pipe to connect the storage tank and the storage room of the syringe with each other to supply the gas stored in the storage tank to the storage room of the syringe; and
   an adjusting valve provided in the gas supply pipe to adjust the supply amount of the gas supplied to the storage room of the syringe from the storage tank.

3. The apparatus of dispensing crystal dispensing using ultrasonic wave according to claim 2, wherein the gas supply unit further comprises,
   a pressure sensor provided in the gas supply pipe between the adjusting valve and the syringe to measure the pressure of the gas supplied to the syringe via the adjusting valve; and
   a constant pressure controlling part comprising a pressure controller configured to control an opening degree of the adjusting valve based on the pressure measured by the pressure sensor, to maintain the pressure of the gas supplied to the syringe uniformly.

4. The apparatus of dispensing crystal dispensing using ultrasonic wave according to claim 1, further comprising:
   a transfer part configured to transfer the syringe along horizontal and vertical directions to dispense the liquid crystal on an entire region of the substrate.

5. The apparatus of dispensing crystal dispensing using ultrasonic wave according to claim 4, wherein the transfer speed of the transfer part is variable.

6. The apparatus of dispensing crystal dispensing using ultrasonic wave according to claim 1, further comprising:
   a dispensing amount controlling part configured to control at least one of the transfer speed of the syringe and the pressure applied to the syringe according to the density of the liquid crystal dispensed on the substrate by the atomizing/dispensing unit.

7. The apparatus of dispensing crystal dispensing using ultrasonic wave according to claim 1, wherein the dispersion preventing part comprises,
   a shroud coupled to the nozzle body to form a space spaced apart a predetermined distance from the nozzle body; and
   an air injecting part provided in a side of the shroud to inject compressed-air via the space between the nozzle body and the shroud.

8. The apparatus of dispensing crystal dispensing using ultrasonic wave according to claim 7, wherein an end of the shroud provided in the dispersion preventing part is inclined to lessen an inner diameter gradually, the end facing the exhausting hole.

9. The apparatus of dispensing crystal dispensing using ultrasonic wave according to claim 7, wherein the shroud comprises a height adjusting part to adjust the height of the end of the shroud with respect to the exhausting hole.

* * * * *